United States Patent
Bourbonnais et al.

(10) Patent No.: US 9,542,406 B1
(45) Date of Patent: Jan. 10, 2017

(54) VERIFYING DATA CONSISTENCY

(71) Applicant: INTERNATIONAL BUSINESS MACHINES CORPORATION, Armonk, NY (US)

(72) Inventors: Serge Bourbonnais, Palo Alto, CA (US); Si Bin Fan, Beijing (CN); Xiao Li, San Jose, CA (US); Jonathan W. Wierenga, Wellington (NZ); Mai Zeng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/080,803

(22) Filed: Mar. 25, 2016

Related U.S. Application Data

(63) Continuation of application No. 15/012,103, filed on Feb. 1, 2016.

(51) Int. Cl.
 *G06F 17/30* (2006.01)
 *G06F 21/55* (2013.01)

(52) U.S. Cl.
 CPC ..... *G06F 17/30117* (2013.01); *G06F 17/3033* (2013.01); *G06F 17/30424* (2013.01); *G06F 17/30371* (2013.01); *G06F 21/552* (2013.01)

(58) Field of Classification Search
 CPC ............ G06F 17/30371; G06F 17/3033; G06F 17/30578; G06F 17/30117; G06F 17/30424; G06F 21/552
 USPC ........................................................ 707/730
 See application file for complete search history.

(56) References Cited

U.S. PATENT DOCUMENTS

| | | | | |
|---|---|---|---|---|
| 5,717,919 | A * | 2/1998 | Kodavalla | G06F 17/30339 |
| 7,668,851 | B2 * | 2/2010 | Triplett | G06F 9/526 |
| | | | | 707/704 |
| 8,392,482 | B1 * | 3/2013 | McAlister | G06F 17/30584 |
| | | | | 707/771 |
| 8,719,232 | B2 * | 5/2014 | Essawi | G06F 21/552 |
| | | | | 707/687 |
| 9,047,334 | B1 * | 6/2015 | Cheriton | G06F 17/30371 |
| 2008/0126741 | A1 * | 5/2008 | Triplett | G06F 9/526 |
| | | | | 711/216 |

(Continued)

FOREIGN PATENT DOCUMENTS

WO 2013103719 A1 7/2013

OTHER PUBLICATIONS www.nobhillsoft.com/Columbo.aspx, "Colombo—Compare Everything to . . . Everything", Printed Jan. 4, 2016, 2 pages.

(Continued)

*Primary Examiner* — Jean M Corrielus
(74) *Attorney, Agent, or Firm* — Reza Sarbakhsh

(57) ABSTRACT

A method for verifying data consistency between update-in-place data structures and append-only data structures containing change histories associated with the update-in-place data structures is provided. The method includes loading data from an update-in-place data structure to a first set of hash buckets in a processing platform, loading data from append-only data structures to a second set of hash buckets in the processing platform, performing a bucket-level comparison between the data in the first set of hash buckets and the data in the second set of has buckets, and generating a report based on the bucket-level comparison.

1 Claim, 6 Drawing Sheets

(56) References Cited

U.S. PATENT DOCUMENTS

| | | | |
|---|---|---|---|
| 2009/0089879 A1* | 4/2009 | Wang | G06F 21/53 |
| | | | 726/24 |
| 2012/0317134 A1 | 12/2012 | Bourbonnais et al. | |
| 2013/0311421 A1* | 11/2013 | Erdogan | G06F 17/30578 |
| | | | 707/609 |
| 2013/0311488 A1* | 11/2013 | Erdogan | G06F 17/30353 |
| | | | 707/752 |
| 2014/0095458 A1* | 4/2014 | Kim | G06F 17/3033 |
| | | | 707/698 |
| 2014/0372374 A1 | 12/2014 | Bourbonnais et al. | |
| 2015/0081637 A1 | 3/2015 | Bourbonnais et al. | |
| 2016/0092124 A1* | 3/2016 | Cowling | G06F 3/0619 |
| | | | 711/103 |
| 2016/0092125 A1* | 3/2016 | Cowling | G06F 3/0619 |
| | | | 711/103 |
| 2016/0092491 A1* | 3/2016 | Cowling | G06F 17/30371 |
| | | | 707/624 |
| 2016/0110109 A1* | 4/2016 | Cowling | G06F 3/065 |
| | | | 711/161 |

OTHER PUBLICATIONS www.devart.com/dbforge/oracle/datacompare/, "Compare Oracle Databases and Synchronize Oracle Data in the Easiest Way", Printed Jan. 4, 2016, 3 pages.
http://querytool.com/, "Advanced Query Tool", Printed Mar. 18, 2015, 3 pages.
www.softtreetech.com/dbtools/, "DB Tools for Oracle Version 6.1", release date: Nov. 20, 2009, 6 pages.
Oracle, "Oracle GoldenGate Veridata", 2014, 6 pages.
Oracle, "Ensuring Data Consistency with Oracle GoldenGate Veridata", Jul. 2013, 11 pages.
www.altova.com/databasespy/database-compare-tool.html, "Database Content Compare and Merge Tool", printed Jan. 4, 2016, 1 page.
www.red-gate.com/products/sql-development/sql-data-compare/, "Compare and Deploy SQL Server Database Contents", printed Jan. 4, 2016, 10 pages.
www.sqldelta.com/, "The All New SQL Delta v6", 2015, 1 page.
www.simego.com/products/sql-admin-studio, "SQL Admin Studio", printed Jan. 4, 2016, 3 pages.
www.innovartis.co.uk/, "Helping Developers Deliver SQL Code, Reliably and Automatically", printed Jan. 4, 2016, 2 pages.
www.adeptsql.com/, "Comparing SQL Schema and Table Data with AdeptSQL Diff", printed Jan. 4, 2016, 1 page.
Mell et al., "The NIST Definition of Cloud Computing", National Institute of Standards and Technology, Special Publication 800-145, Sep. 2011, pp. 1-7.
Disclosed Anonymously, "Methodology for Intelligent Recovery Model for System with Missing/Corrupted Transactional Log Files", IP.com, Dec. 5, 2014, 6 pages.
IBM: List of IBM Patents or Patent Applications Treated as Related (Appendix P), Jul. 14, 2016, pp. 1-2.
Bourbonnais et al., Pending U.S. Appl. No. 15/012,103, filed Feb. 1, 2016, titled "Verifying Data Consistency,", pp. 1-49.

* cited by examiner

VERIFYING DATA CONSISTENCY

BACKGROUND

The present invention generally relates to verifying data consistency, and more particularly verifying data consistency between update-in-place data structures and append-only data structures.

Emerging processing solutions provide a platform for curation and analysis of massive amounts of live (continuously updated) data by integrating big data processing with recovery log capture technology associated with update-in-place data structures, such as a relational database management systems (RDBMS). Big data refers to a massive amount of structured and/or unstructured data that is too large to process with traditional database techniques, e.g., a query-in-serial. Big data platforms may use distributed storage architecture (e.g., a distributed file system) and a distributed processing architecture. To support queries over a temporally complete, continuously updated history of RDBMS change data, processing solutions may continuously append the change history into big data targets, such as an append-only data structure (e.g., a log file/table stored in a distributed file system associated with a big data platform). However, data changes due to faulty replication processes, data corruptions, operator errors, and the like, may occur at the side of the update-in-place data structure or the side associated with the append-only data structure.

SUMMARY

According to one embodiment, a method for verifying data consistency between update-in-place data structures and append-only data structures containing change histories associated with the update-in-place data structures is provided. The method may include loading data from an update-in-place data structure to a first set of hash buckets in a processing platform, loading data from append-only data structures to a second set of hash buckets in the processing platform, performing a bucket-level comparison between the data in the first set of hash buckets and the data in the second set of has buckets, and generating a report based on the bucket-level comparison.

According to another embodiment, a computer program product for verifying data consistency between update-in-place data structures and append-only data structures containing change histories associated with the update-in-place data structures is provided. The computer program product may include at least one computer readable non-transitory storage medium having computer readable program instructions for execution by a processor. The computer readable program instructions may include instructions for loading data from an update-in-place data structure to a first set of hash buckets in a processing platform, loading data from append-only data structures to a second set of hash buckets in the processing platform, performing a bucket-level comparison between the data in the first set of hash buckets and the data in the second set of has buckets, and generating a report based on the bucket-level comparison.

According to another embodiment, a computer system for verifying data consistency between update-in-place data structures and append-only data structures containing change histories associated with the update-in-place data structures is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for loading data from an update-in-place data structure to a first set of hash buckets in a processing platform, loading data from append-only data structures to a second set of hash buckets in the processing platform, performing a bucket-level comparison between the data in the first set of hash buckets and the data in the second set of has buckets, and generating a report based on the bucket-level comparison.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
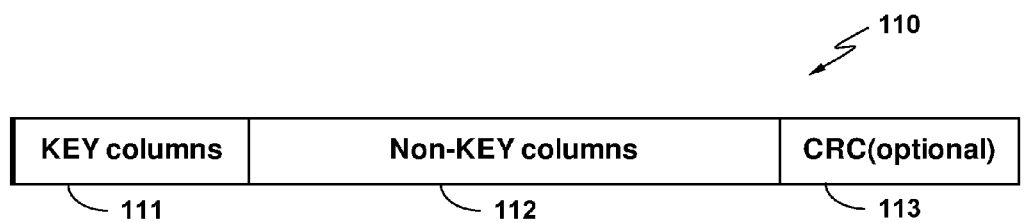
FIGS. 1A-1C represent exemplary row structures for an update-in-place data structure, an append-only data structure, and a difference report, respectively, according to embodiments.

Various embodiments of the present invention will now be discussed with reference to FIGS. 1-6, like numerals being used for like and corresponding parts of the various drawings.

According to one embodiment, provided is a method for verifying data consistency between update-in-place data structures (e.g., files or tables) and append-only data structures (e.g., files or tables) containing change histories associated with the update-in-place data structures by loading data from the update-in-place data structures and append-only data structures into respective hash buckets in a processing platform (such as a big data platform, e.g., a cluster of machines running a big data processing framework) and performing a bucket level comparison between corresponding hash buckets. The data from the update-in-place data structures may be loaded to a first set of hash buckets based on hash values determined by key values associated with the data in the update-in-place data structures, and the data from the append-only data structures may be loaded to a second set of hash buckets based on hash values determined by key values associated with the data in the append-only data structures. The bucket level comparison may be directed to comparing data in buckets associated with the same hash value, i.e., a common hash value. A report, e.g., a difference report, may be generated based on the bucket-level comparison.

The methods, computer program products, and systems disclosed herein may enable data consistency verification between an update-in-place data structure, such as a relational database management system (RDBMS), and data replicated to a processing platform (e.g., a big data platform) by comparing RDBMS data to data in append-only data structures containing a change history, which may be stored as log-structured data structures in a big data target (e.g., a distributed file system associated with a big data platform). Update-in-place data structures may be continuously updated by various workloads, e.g., in the non-limiting case of online transaction processing (OLTP). Append-only data structures may contain a temporally complete history of change data for the update-in-place data structures, e.g., RDBMS change data. The change data (e.g., writesets) may be continuously appended to the append-only data structures by replication software.

Data consistency verification, as disclosed herein, may be performed in near-real time without system downtime, according to an embodiment. For example, a system shutdown may not be necessary to perform the data consistency verification disclosed herein, according to an embodiment.

The methods, computer program products, and systems disclosed herein may enable detection of persistent differences (i.e., actual differences between an update-in-place data structure and append-only data structures) as opposed to transient differences introduced during the verification process caused by asynchronous replication process latency. For example, transient differences may be introduced by in-flight transactions or rollback transactions committed at the update-in-place data structure side after the data consistency verification process has commenced. By detecting and removing transient differences from a difference report, the difference report may inform a reviewer or system of only actual differences that may require attention or corrective action.

FIG. 1A depicts an exemplary source row structure 110 for an update-in-place data structure, according to an embodiment. In an embodiment, data stored in the source row structure 110 may be replicated to a big data target, such as an append-only data structure, which may include a temporally complete history of changes to the update-in-place data structure. Source row structure 110 may include source key columns 111, source non-key columns 112, and source checksum values 113.

Source key columns 111 may contain key values associated with rows in the update-in-place data structure. Each key value may uniquely identify a row in the update-in-place data structure. Source non-key columns 112 may include other, remaining columns of data in the update-in-place data structure. Data in source non-key columns 112 may include filename, data type, and other attributes. Source checksum values 113 may include row-based checksum values for the record, i.e., data associated with a row in the update-in-place data structure. It is contemplated that source row structure 110 (and the update-in-place data structure) may include additional data and/or information.

In an embodiment, a row structure for a source update-in-place data structure may not include checksum values for the source data. In such case, the checksum values may be calculated during data loading from the update-in-place data structure to the processing platform (during data consistency verification).

After or during a data change in the update-in-place data structure, replication software may capture the changes by reading a transaction recovery log, or the update-in-place data structure (e.g., RDBMS) may trigger a logging process, which may append the changes to corresponding append-only files. In an embodiment, an update-in-place data structure may correspond to an append-only file, which may be a temporal file, log structured file, history file, change file, etc.

Figure 1B:
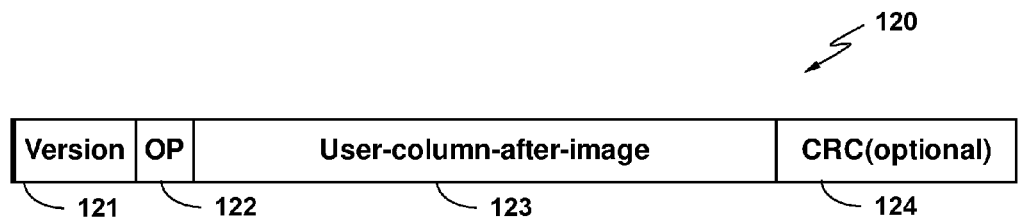

FIG. 1B depicts an exemplary target row structure 120 for an append-only data structure, according to an embodiment. In an embodiment, data stored in the target row structure 120 may include a temporally complete history of changes to a source, update-in-place data structure. Target row structure 120 may include version values 121, difference type 122, user-column-after-image values 123, and target checksum values 124.

Version values 121 may identify the change sequences of a specific record. In an embodiment, version values 121 may be a log sequence number (LSN) or transaction commit timestamp (e.g., COMMIT_TIME). The LSN may uniquely identify a change in an RDBMS recovery log, and the LSN value may ascend globally. The COMMIT_TIME may be extracted from the transaction manager log entry or generated by RDBMS triggers.

Difference type 122 may be a flag indicating the type of operation for a particular record. Types operations listed in difference type 122 may be an insertion (I), an update (U), or a deletion (D).

User-column-after-image values 123 may contain values that are in the source column (i.e., in the source, update-in-place data structure) after the data change. For each source column, target row structure 120, may contain a corresponding after-image column. User-column-after-image values 123 stored in the after-image columns may include the same filename, data type, and other attributes as the corresponding source columns in target row structure 120. In the case of an update, the after-image value may reflect the new value of the data that was updated. In the case of a deletion, the after-image value may reflect the value of the data that was deleted. In the case of an insertion, the after-image value may reflect the value of the data that was inserted.

In an embodiment, a single key value in the source, update-in-place data structure may correspond to multiple rows in the append-only data structures, with each row (in the append-only files) corresponding to a specific version of the single key value.

Target checksum values 124 may include row-based checksum values for the data, i.e., record, associated with a row in the append-only data structures.

It is contemplated that target row structure 120 (and the append-only data structures) may include additional data and/or information.

In an embodiment, a row structure for an append-only data structure may not include checksum values for the target data. In such case, the checksum values may be calculated during data loading from the append-only data structures to the processing platform (during data consistency verification) or during the data comparison process. In an embodiment, the checksum values for the source data and the checksum values for the target data are determined using the same function, i.e., a common function.

Figure 1C:
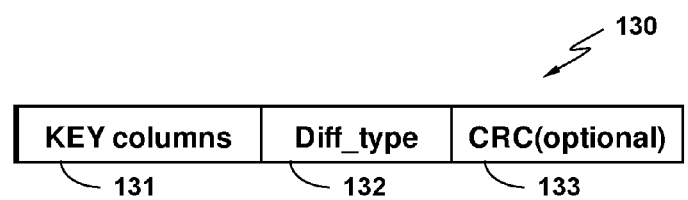

FIG. 1C depicts an exemplary report row structure 130 for a difference report, according to an embodiment. In an embodiment, data from an update-in-place data structure (e.g., stored in source row structure 110) may be compared to data from append-only data structures (e.g., stored in target row structure 120) to verify data consistency. Differences between the data may be provided in a report, e.g., a difference report, containing report row structure 130. Report row structure 130 may include report key columns 131, report difference type 132, and report checksum values 133.

Report key columns 131 may contain key values associated with differences listed in the difference report. Each key value may uniquely identify a difference in the report. Report difference type 132 may be a flag indicating the type of operation associated with a listed difference. Types of operations listed in report difference type 132 may be an insertion (I), an update (U), or a deletion (D).

An insertion (I) may indicate that a current snapshot of the append-only data structure does not contain such a key value. An update (U) may indicate that the non-key columns of the source, update-in-place data structure (e.g., non-key columns 112) and the corresponding target columns, append-only data structure (e.g., user-column-after-image values 123) do not match. A deletion (D) may indicate that a current snapshot of the update-in-place data structure does not contain such a key value.

Report checksum values 133 may include the row-based checksum values for the data in the update-in-place data structures and the row-based checksum values for the append-only data structures.

Figure 2:
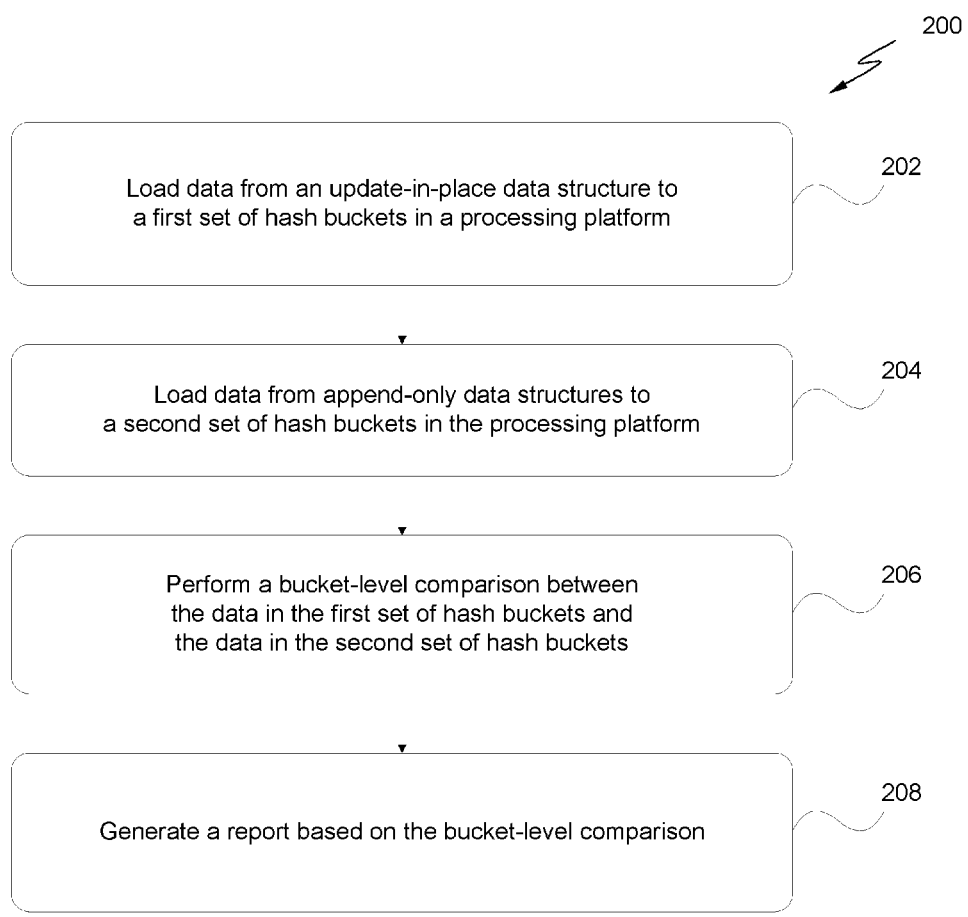
FIG. 2 is a flowchart illustrating an exemplary method for verifying data consistency between update-in-place data structures and append-only data structures containing change histories associated with the update-in-place data structures, according to an embodiment.

FIG. 2 illustrates a first flowchart 200 depicting an exemplary method for verifying data consistency between update-in-place data structures and append-only data structures containing change histories associated with the update-in-place data structures, according to an embodiment. At 202, data from an update-in-place data structure (e.g., RDBMS) may be loaded to a first set of hash buckets in a processing platform, such as a big data platform (e.g., a cluster of machines running a big data processing framework). The data may be fetched or unloaded from the update-in-place data structure in an uncommitted read (UR) isolation level, which may minimize the impact on the update-in-place data structure.

In a first aspect, data transmission from the update-in-place data structure to the big data platform may be implemented by transferring key values and the row-based checksums from the update-in-place data structure to the big data platform. In one embodiment, the original data in the update-in-place data structure may be concurrently fetched using multiple database connections. In another embodiment, data in a particular key value range may be fetched in a separate job running in the big data processing framework. Parallel fetching may be scheduled in different nodes or machines within a cluster running the big data processing framework. In another embodiment, less than all available columns of data are transferred, which may reduce the overhead cost of network transmission. In embodiments where the update-in-place data structures do not contain row-based checksum values, the checksum values may be calculated using a stored procedure or user-defined function when the rows of data are fetched from the update-in-place data structure.

In another aspect, data transmission from the update-in-place data structure to the big data platform may be implemented by unloading the original data in the update-in-place data structure to an external file without the overhead cost of passing structured query language (SQL) statements to the update-in-place data structure (via SQL tools and utilities) or the overhead cost of loading such SQL statements to the big data platform.

The loaded data (e.g., key values, row-based checksums) may be stored in the first set of hash buckets in the big data platform based on hash values associated with the key values of loaded data. The hash values may be calculated by a hash function, which may be predetermined. In one embodiment, the rows of loaded data may be evenly distributed among the hash buckets.

In one embodiment, the number of hash buckets is user-defined. In another embodiment, the number of buckets is adjustable based on the number of rows in the update-in-place data structure.

In one embodiment, the loaded data in each hash bucket is persistent on the disks associated with the cluster of machines associated with the big data platform. In another embodiment, the loaded data in each hash bucket is not persistent on the disks associated with the big data platform, and in the case of a failure, the data may be reloaded or re-fetched from the update-in-place data structure.

At 204, data from one or more append-only data structures (e.g., recovery log files) may be loaded to a second set of hash buckets in the processing platform. A current or latest snapshot of the append-only data structure may be generated and stored in the second set of hash buckets based on hash values associated with the key values of the data in the append-only data structure. The hash values may be calculated by a hash function, which may be predetermined. In an embodiment, the hash function used to calculate the hash values for data from the append-only data structure is the same hash function used to calculate the hash values for data from the update-in-place data structure, i.e., the hash function is common to both sets of calculations.

In an embodiment, the loaded data from the append-only data structure may be limited to data with a source side COMMIT_TIME that is earlier than a start time for loading the data from the update-in-place data structure (see step 202).

In one embodiment, a single update-in-place data structure may correspond to multiple append-only data structures. The time domain of COMMIT_TIME may be split into multiple successive intervals, and each interval may correspond to a separate append-only data structure. It is contemplated that LSN may similarly be split into multiple successive versions, and each version may correspond to a separate append-only data structure. In one embodiment, data from separate append-only data structures may be loaded in separate jobs running in the big data processing framework. The separate jobs may be distributed to different nodes within the computing cluster. In one embodiment, assignment of a job to a particular node is based on the location of the data.

In one embodiment, for each specific key value in an append-only data structure, the rows with a higher version number may be loaded. In a non-limiting example, an SQL interface may be used to fetch the rows for generating the latest snapshot: "SELECT max(VERSION), KEY-user-columns-after-image, CRC, OP FROM append-only-file GROUP BY KEY-user-columns-after-image, CRC, OP." The non-limiting exemplary query may be internally converted to multiple jobs by an SQL utility.

In embodiments where the append-only data structures do not contain row-based checksum values, the checksum values may be calculated using a stored procedure or user-defined function, which may be the same as (or common with) the function used to calculate checksum values in the update-in-place data structure. In one embodiment, after completing a checksum calculation, the values of non-key columns may no longer be loaded/stored.

In one embodiment, data representation of user-column-after-image in append-only data structures may be different from the data representation in the update-in-place data structure. For example, code pages associated with the append-only data structures and the update-in-place data structure may be different. An original transformation may have been conducted during replication or movement of data changes for the update-in-place data structures. In such cases, a corresponding data transformation may be performed prior to calculating the row-based checksums.

In one embodiment, loading the data from the append-only data structures may be performed in parallel with loading the data from the update-in-place data structure.

At 206, a bucket-level comparison may be performed between the data in the first set of hash buckets (i.e., loaded from the update-in-place data structure) and the second set of hash buckets (i.e., loaded from the append-only data structures).

In one embodiment, rows of data from the append-only data structures associated with a deletion (D) operation may be removed from the second set of hash buckets. Such rows may be removed from the current or latest snapshot of the append-only data structures. Removal of the rows may be performed before or during bucket-level comparison.

Hash buckets having the same hash value (or sharing a common hash value) may be compared in the same processing job. In a further embodiment, at least one hash bucket may be moved to a node where another hash bucket sharing the same hash value is located. In one embodiment, multiple bucket-level comparison jobs are performed in parallel.

At 208, a report (e.g., a difference report) may be generated based on the bucket-level comparison. In one embodiment, key values may be omitted (or removed) from the difference report when the key value and row-based checksum values between the first and second hash buckets match. In an embodiment, a specific key value may be identified as a difference (in the difference report) when that key's corresponding (update-in-place and append-only) checksum values do not match or the key value does not exist in either the update-in-place data structure or the append-only data structures.

In one embodiment, no update occurs at either the source side (i.e., update-in-place data structure) or the target side (i.e., append-only data structures) during the data loading and the bucket-level comparison, and the difference report may be finalized as the final report. In another embodiment, an initially generated difference report (which may be considered an intermediate report) may contain differences (i.e., transient differences) caused by in-flight transactions and/or the dirty read of data due to rollback transactions. In a further embodiment, transient differences may be removed from the initially generated difference report based on the bucket-level comparison.

Figure 3:
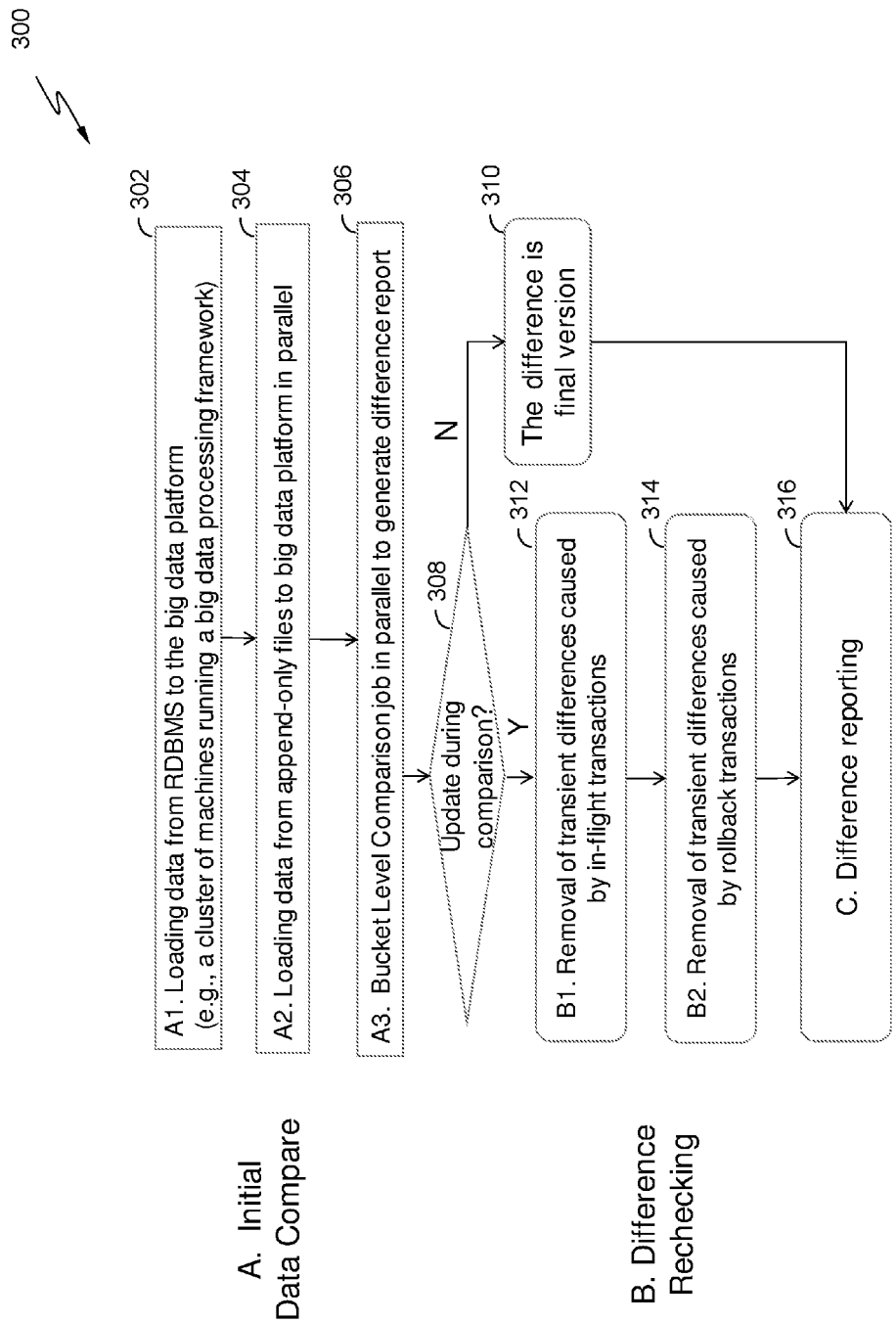
FIG. 3 is another flowchart illustrating an exemplary method for verifying data consistency between update-in-place data structures and append-only data structures containing change histories associated with the update-in-place data structures, according to an embodiment.

FIG. 3 illustrates a second flowchart 300 depicting another exemplary method for verifying data consistency between update-in-place data structures and append-only data structures containing change histories associated with the update-in-place data structures, according to an embodiment. At 302, data from an update-in-place data structure (e.g., RDBMS) may be loaded to a first set of hash buckets in a processing platform, such as a big data platform (e.g., a cluster of machines running a big data processing framework). At 304, data from one or more append-only data structures (e.g., recovery log files). Data from the RDBMS and the append-only files may be respectively loaded into a first set and a second set of hash buckets, as described above regarding steps 202 and 204 in FIG. 2.

At 306, a bucket-level comparison may be performed between the data in the first set of hash buckets and the second set of has buckets, as described above regarding step 206 in FIG. 2.

At 308, a determination may be made as to whether an update occurred during the bucket-level comparison. An update may occur in the update-in-place data structure or in the append-only data structure. In an embodiment, the determination may also include updates occurring during loading the data from the update-in-place data structure and/or the data from the append-only data structures.

If no update occurred, at 310, an initial difference report based on the bucket-level comparison (performed at 306, described above) may be finalized as the final difference report, which may be reported or otherwise made available for querying and/or review (see, e.g., step 316, described below).

If an update occurred, transient differences may be identified and removed from the initial difference report based on the bucket-level comparison (performed at 306, described above). The number of transient differences may be considerably smaller than the number of differences identified between the update-in-place data structure and the append-only data structure in the bucket-level comparison.

At 312, transient differences caused by in-flight transactions may be identified and removed from the difference report. Transient differences caused by in-flight transactions may include unread/unprocessed incremental changes committed at the update-in-place data structure after the start of loading data from the update-in-place data structure to the processing platform.

In an embodiment, unread/unprocessed incremental changes committed after the start of loading data from the update-in-place data structure may be read/processed if the incremental changes have a size (e.g., transaction duration) longer than the sum of (i) the longest maximum replication end-to-end latency and (ii) the time of the longest-running transaction (in the data structures being compared).

In an embodiment, checksums for incremental changes may be calculated. If key values and row-based checksums for incremental changes match corresponding values of the update-in-place data structure (included in the initial difference report), the difference associated with the incremental changes may be removed from the initial difference report.

In one embodiment, a Bloom filter may be used to check incremental changes having key values included in the initial difference report.

In one embodiment, differences in the initial difference report may be sorted based on the row-based checksum values. A binary search may be used to confirm if incremental changes have the same row-based checksum values.

At 314, transient differences caused by rollback transactions may be identified and removed from the difference report. In an embodiment, after transient differences caused by in-flight transactions are removed (during step 312), key values for the remaining transient differences may be used to re-retrieve rows (e.g., a row-by-row re-fetch) from the update-in-place data structure in a cursor stable (CS) isolation level (or higher isolation level). After the row-by-row re-fetch, a waiting interval may pass before unread/unprocessed incremental changes (associated with the remaining transient differences) may be loaded/read and processed. The waiting interval may have a duration longer than the sum of (i) the longest maximum replication end-to-end latency and (ii) the time of the longest-running transaction (in the data structures being compared).

In an embodiment, checksums for re-fetched keys may be calculated, and may be used to identify transient differences. Incremental changes (associated with the re-fetched keys) may be transient differences if the key values and row-based checksums for the re-fetched keys match (a) the key values and row-based checksums of the append-only data structures in the initial difference report; or (b) the key values and the row-based checksums of the rows in the incremental changes. Such transient differences may be removed from the initial difference report.

At 316, a final difference report may be generated. The final difference report may reflect differences between an update-in-place data structure and append-only data structures. The final difference report may omit transient differences that may have been identified and removed from an initial difference report based on the bucket-level comparison described above. The final difference report may list persistent differences between the compared update-in-place data structure and append-only data structures. In an embodiment, the differences may persist on the processing platform, e.g., a big data platform. In an embodiment, the differences may be inserted into another data structure associated with the source, update-in-place data structure (e.g., a different table in an RDBMS). In an embodiment, a user may query results of the final difference report on either side (i.e., at the update-in-place side, such as an RDBMS, or at the side associated with the append-only side, such as a big data platform).

The methods, computer products, and systems disclosed herein may enable a live comparison of update-in-place data structures and append-only data structures. For example, persistent differences may be detected while data structures (e.g., RDBMS, append-only log files) are being actively updated or appended. Embodiments disclosed herein may have low impact on update-in-place data structures (e.g., RDBMS) by utilizing low cost, distributed processing and storage capabilities in a big data processing platforms. For example, the embodiments disclosed herein may have minimal locks on rows of data in an update-in-place data structure. Data loading, data transformation, and data comparison may be chunked into smaller jobs and parallelism of jobs may be handled by data management layers associated with a big data processing platform to maximize throughput with failure tolerance. Embodiments disclosed herein may analyze and compare large volumes of data with high scalability.

One or more aspects of the embodiments disclosed herein may be provided as part of a cloud-based service.

In one embodiment, the data from the update-in-place data structure comprises a first set of key values that corresponds to rows of data in the update-in-place data structure, and loading the data from the update-in-place data structure to the first set of hash buckets is based on a first set of hash values associated with the first set of key values.

In one embodiment, the data from the append-only data structures comprises a second set of key values that corresponds to rows of data in the append-only data structures, and loading the data from the append-only data structures to the second set of hash buckets is based on a second set of hash values associated with the second set of key values.

In one embodiment, first set of hash values and the second set of hash values are determined based on a common hash function.

In one embodiment, the bucket-level comparison is performed on buckets from the first set of hash buckets sharing common hash values with buckets from the second set of hash buckets.

In one embodiment, the data from the update-in-place data structure includes a first set of checksum values that corresponds to rows of data in the update-in-place data structure, and the data from append-only data structures includes a second set of checksum values that corresponds to rows of data in the append-only data structures.

In one embodiment, the method further includes generating a first set of checksum values that corresponds to rows of data in the update-in-place data structure and generating a second set of checksum values that corresponds to rows of data in the append-only data structures, and generating the first set of checksum values and generating the second set of checksum values are based on a common function (i.e., a function common to both sets of calculations). That is, the first set of checksum values and the second set of checksum values are calculated with the same function.

In one embodiment, the report based on the bucket-level comparison includes a third set of key values corresponding to differences between the update-in-place data structure and the append-only data structures, a set of difference types corresponding to the third set of key values, checksum values from the first set of checksum values corresponding to the third set of key values, and checksum values from the second set of checksum values corresponding to the third set of key values.

In one embodiment, generating the report based on the bucket-level comparison includes determining an update occurred to the update-in-place data structure during the bucket-level comparison. In a further embodiment, generating the report based on the bucket-level comparison includes identifying transient differences between the update-in-place data structure and the append-only data structures, with the transient differences being differences caused by in-flight transactions committed at the update-in-place data structure after loading the data from the update-in-place data structure to the first set of hash buckets in the processing platform, and removing the transient differences from an intermediate report listing differences between the update-in-place data structure and the append-only data structures.

In another embodiment, generating the report based on the bucket-level comparison includes identifying transient differences between the update-in-place data structure and the append-only data structures, with the transient differences are differences caused by rollback transactions committed at the update-in-place data structure after loading the data from the update-in-place data structure to the first set of hash buckets in the processing platform, and removing the transient differences from an intermediate report listing differences between the update-in-place data structure and the append-only data structures.

In one embodiment, loading the data from the update-in-place data structure to the first set of hash buckets and loading the data from the append-only data structures to the second set of hash buckets is performed in parallel.

In one embodiment, the bucket-level comparison is performed in parallel.

In one embodiment, the update-in-place data structure is a relational database management systems (RDBMS).

Embodiments disclosed and contemplated herein may be implemented and/or performed by any type of computer, known or contemplated, regardless of the platform being suitable for storing and/or executing program code.

Figure 4:
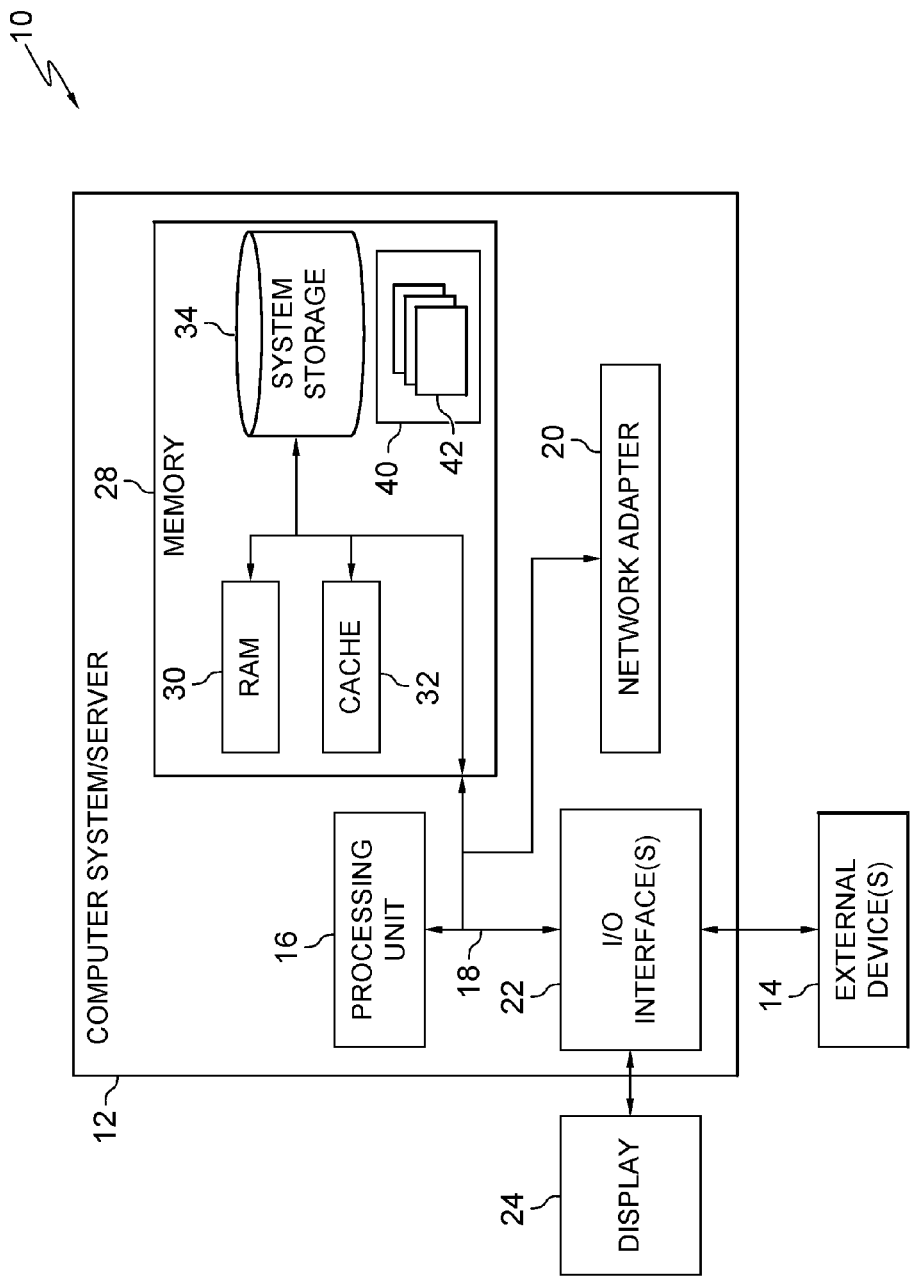
FIG. 4 is a block diagram illustrating a computing node, according to an aspect of the invention.

FIG. 4 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
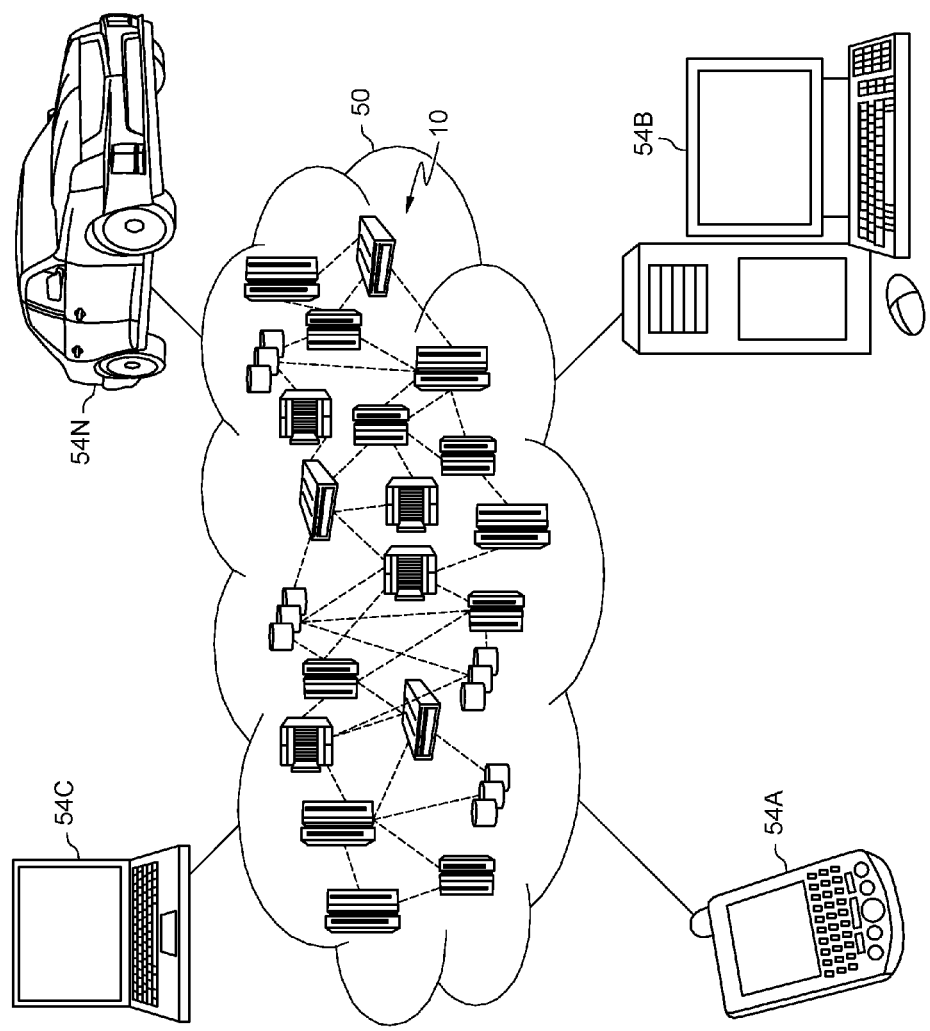
FIG. 5 depicts a cloud computing environment according to an embodiment of the present invention.

Referring now to FIG. 5, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
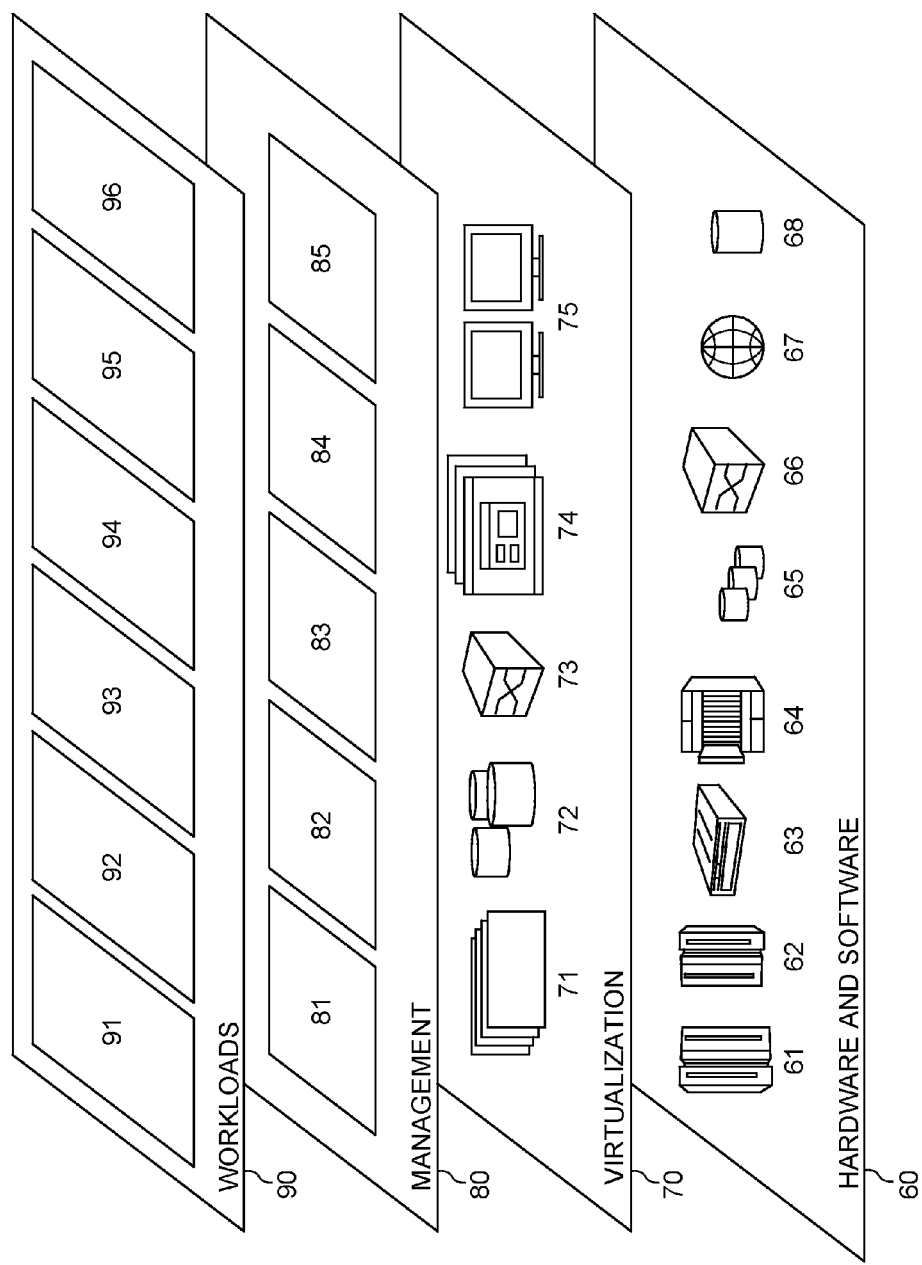
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data consistency verification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for verifying data consistency between update-in-place data structures and append-only data structures containing change histories associated with the update-in-place data structures, the method comprising:
   loading data from an update-in-place data structure to a first set of hash buckets in a processing platform;
   loading data from append-only data structures to a second set of hash buckets in the processing platform;
   performing a bucket-level comparison between the data in the first set of hash buckets and the data in the second set of has buckets;
   generating an initial report based on the bucket level comparison;
   determining an update occurred during the bucket level comparison;
   removing from the initial report transient differences between the update-in-place data structure and the append-only data structures, wherein the transient differences comprise differences caused by rollback transactions committed at the update-in-place data structure after loading the data from the update-in-place data structure to the first set of hash buckets in the processing platform, and wherein the removing comprises a row-by-row re-fetch from the update-in-place data structure in an isolation level higher than a cursor stable isolation level; and
   generating a final report based on the initial report and removal of the transient differences.

* * * * *